US 7,228,536 B2

United States Patent
Matsumoto

(10) Patent No.: US 7,228,536 B2
(45) Date of Patent: Jun. 5, 2007

(54) SYSTEM FOR REWRITING CONTROL PROGRAM IN VENDING MACHINE

(75) Inventor: Naoto Matsumoto, Maebashi (JP)

(73) Assignee: Sanden, Corporation (JP)

( * ) Notice: Subject to any disclaimer, the term of this patent is extended or adjusted under 35 U.S.C. 154(b) by 257 days.

(21) Appl. No.: 09/736,168

(22) Filed: Dec. 15, 2000

(65) Prior Publication Data

US 2001/0012975 A1    Aug. 9, 2001

(30) Foreign Application Priority Data

Dec. 15, 1999    (JP)    ................................. 11-355994

(51) Int. Cl.
*G06F 9/44*    (2006.01)
*G06F 9/445*    (2006.01)

(52) U.S. Cl. ...................... 717/168; 717/174; 717/175; 717/177

(58) Field of Classification Search ........ 717/168–178; 711/111, 114, 163; 700/12, 169, 79, 244, 700/3, 1, 238; 710/8; 712/248; 320/110; 705/26

See application file for complete search history.

(56) References Cited

U.S. PATENT DOCUMENTS

| | | | | |
|---|---|---|---|---|
| 4,636,963 A | * | 1/1987 | Nakajima et al. ............ 700/238 |
| 4,722,058 A | * | 1/1988 | Nakayama et al. .......... 700/243 |
| 4,783,747 A | * | 11/1988 | Komori et al. ............... 700/244 |
| 5,053,952 A | * | 10/1991 | Koopman et al. ............ 712/248 |
| 5,307,346 A | * | 4/1994 | Fieldhouse .................. 700/169 |
| 5,388,211 A | * | 2/1995 | Hornbuckle ................. 717/178 |
| 5,444,861 A | * | 8/1995 | Adamec et al. ............. 717/178 |
| 5,581,458 A | * | 12/1996 | Richmond ................... 700/12 |
| 5,603,056 A | * | 2/1997 | Totani ......................... 710/8 |
| 5,651,132 A | * | 7/1997 | Honda et al. ................ 711/114 |
| 5,657,301 A | * | 8/1997 | Yoshikawa et al. ......... 711/111 |
| 5,664,134 A | * | 9/1997 | Gallup et al. ............... 712/245 |
| 5,744,933 A | * | 4/1998 | Inoue et al. ................. 320/110 |
| 5,787,288 A | * | 7/1998 | Nagata et al. ............... 717/173 |
| 5,844,796 A | * | 12/1998 | Araki ........................... 717/170 |
| 6,018,720 A | * | 1/2000 | Fujimoto ..................... 705/26 |

(Continued)

FOREIGN PATENT DOCUMENTS

JP    09069182 A    *    3/1997

(Continued)

OTHER PUBLICATIONS

WO 96/36023, Konsmo, Oyestein, Metho of Updating of price and display messages in a local unit, Nov. 1996.*

(Continued)

*Primary Examiner*—Wei Zhen
*Assistant Examiner*—Satish S. Rampuria
(74) *Attorney, Agent, or Firm*—Banner & Witcoff, Ltd.

(57) ABSTRACT

The present invention provides a vending machine control program rewriting system that facilitates the rewriting of a control program in the vending machine. The vending machine comprises a communication controller which receives a new control program sent from a host computer 200 at a remote location. The memory storing the control program is a rewritable memory. The current control program in the rewritable memory is easily rewritten to the new one of the control program sent from the host computer. The control program rewrite is readily performed, making it possible to greatly reduce the time and trouble required for updating the control program in the vending machine.

17 Claims, 8 Drawing Sheets

U.S. PATENT DOCUMENTS

| | | | |
|---|---|---|---|
| 6,339,726 B1 * | 1/2002 | Miyata et al. | 700/3 |
| 6,339,731 B1 * | 1/2002 | Morris et al. | 700/236 |
| 6,402,028 B1 * | 6/2002 | Graham et al. | 235/380 |
| 6,496,753 B1 * | 12/2002 | Ehara | 700/241 |
| 6,501,995 B1 * | 12/2002 | Kinney et al. | 700/1 |
| 6,643,843 B1 * | 11/2003 | Reger | 717/168 |
| 6,647,301 B1 * | 11/2003 | Sederlund et al. | 700/79 |
| 6,892,255 B2 * | 5/2005 | Teshima | 710/74 |
| 6,993,758 B1 * | 1/2006 | Fujita et al. | 717/168 |
| 7,054,909 B1 * | 5/2006 | Ohkubo et al. | 709/208 |
| 2001/0054134 A1 * | 12/2001 | Nagatomo et al. | 711/163 |

FOREIGN PATENT DOCUMENTS

| | | | |
|---|---|---|---|
| JP | 09305839 A | * | 11/1997 |
| JP | 11007393 A | * | 1/1999 |
| JP | 11045367 A | * | 2/1999 |
| JP | 11-265282 A | * | 9/1999 |
| JP | 2000172917 A | * | 6/2000 |
| WO | WO 9636023 A1 | * | 11/1996 |

OTHER PUBLICATIONS

Segal et al., Dynamic program updating in a distributed computer system, IEEE, Oct. 1988 pp. 198-203.*

Segal et al., Dynamically updating distributed software: supporting change in uncertain and mistrustful environments, IEEE, Oct. 1989, pp. 254-261.*

Yeung et al., A kernel design to support migration of program objects and program visualization in distributed computing, IEEE, Oct. 1996, p. 1574-1579 vol. 2.*

Seong et al., A new write-invalidate snooping cache coherence protocol for split transaction bus-based multiprocessor systems, IEEE, Oct. 19-21, 1993 pp. 229-232 vol. 1.*

Andre et al., Learning and upgrading rules for an OCR system using genetic programming, IEEE, Jun. 1994 pp. 462-467 vol. 1.*

* cited by examiner

SYSTEM FOR REWRITING CONTROL PROGRAM IN VENDING MACHINE

BACKGROUND OF THE INVENTION

The present invention relates to updating a control program in a vending machine which sells a variety of goods or products, and more particularly to a system for rewriting the control program.

In the prior art, a vending machine of the type has a vending machine control device which comprises a storage unit for storing a control program, an arithmetic and logic unit for executing the control program, and an interface portion for interfacing with a variety of equipment. The control device controls operation of the vending machine by the arithmetic and logic unit executing the control program stored in the storage unit. Here, a read-only memory (ROM), which is a nonvolatile memory, is used as the storage unit for storing the control program. As equipment connected to the interface portion, there is a set of goods selection buttons for permitting a customer to input a purchase request of a desired goods by touching a corresponding one of the buttons, a display device for displaying prices and other information, a compressor, a fan and others in a refrigerating system, and a remote controller for permitting a manager to control the vending machine by operating the controller.

After selling vending machines of the type described in the vending machine market, each having a current one of the control program in the storage unit, there is often a case in which a new version of the control program is developed due to, for example, modifications in the remote controller operating method, and becomes available. In other words, the version of the control program is upgraded. In the conventional control device, since the ROM which is a nonvolatile memory is used as the storage unit, the ROM must be replaced from one storing a current version of the control program to another storing a new version of the control program each time the version of the control program is upgraded. However, since the replacement of ROM for many vending machines requires much time and labor and is extremely troublesome, it has a problem as a method for updating the control program.

Accordingly, there has been a proposal to use an electrically rewritable erasable programmable ROM (EP-ROM) as the storage unit, and to store a rewrite program together with the current control program. According to the proposal, the current one of the control program in the EP-ROM can be rewritten, under the control of the rewrite program, to the new version of the control program by connecting the control device to a memory card having the new version stored therein, or to a floppy disk drive (FDD) for driving a floppy disk storing the new version of the control program. The proposal can considerably reduce the time and trouble required to update the version of the control program. However, it is not yet resolved a worker must travel to installation sites of vending machines scattered in various locations in order to connect a memory card or FDD each time the version of the control program version is upgraded.

Further, in a case in which the price of one of goods being sold is changed, or a new goods is intended be sold, the control program must be changed in all of used vending machines at once and at the almost same time. However, it is extremely difficult to perform this work for all used vending machines in a limited amount of time.

SUMMARY OF THE INVENTION

With the foregoing in view, it is an object of the present invention to provide a vending machine control program rewrite system for permitting to easily rewrite the control program in the vending machine. It is another object to provide a vending machine having a control device adapted to the vending machine control program rewrite system.

To achieve the above-mentioned objects, the present invention provides a vending machine control program rewrite system for rewriting a current one of a control program of a vending machine. The vending machine comprises a control device having a storage unit storing the current control program. The vending machine control program rewrite system comprises a host computer for sending a new one of the control program to the vending machine. The control device of the vending machine comprises a rewritable memory as the storage unit, a receiver adapted to receive the new control program from the host computer, and rewriter adapted to rewrite the control program in the rewritable memory from the current one to the new one of the control program.

According to this invention, the new control program can be sent from the host computer even at a remote location and is received at the vending machine side by the receiver, and the control program in the vending machine is rewritten from the current one to the new one of the control program by rewriter.

Further, according to this invention, the new control program sent by the host computer is simultaneously received at a plurality of vending machines. Therefore, the current ones of the control program of a plurality of vending machines can be rewritten to the new ones at the same time.

It may be designed that host computer sends the new control program to the vending machine or machines in accordance with a predetermined schedule.

In a preferred embodiment, the host computer sends to the vending machine or machines, together with the new control program, the attribute information of the control program. The rewriter in each of the vending machine or machines has a rewrite determininator adapted to determine, based on the attribute information received, whether or not the control program should be rewritten from the current one to the new one.

The attribute information is information related to the type of vending machine and program properties, such as version.

Further, the control device of the vending machine has a rewrite program previously stored therein. The rewriter performs rewrite of the control program by executing the rewrite program. Alternatively, the host computer sends to the vending machine, together with the new control program, the rewrite program of the new control program. The rewriter performs the rewrite of the control program from the current one to the new one by executing the rewrite program received from the host computer.

According to another embodiment of this invention, the host computer sends to the vending machine, together with the new control program, data remapping information which shows the mapping information of data used with the new control program. The rewriter in the control device has data remapping portion, which, based on a data mapping information that shows current map of data which the current control program uses and the data remapping information received from the host computer, performs remapping of the current data so that the data can be used by the new control program. In another embodiment of this invention, the host computer sends to the vending machine, together with the new control program, the data remapping information and a data remapping program for performing the data remapping. The rewriter performs data remapping by executing the data remapping program received from the host computer so that the current data used by the current control program can be used by the new control program.

According to the embodiment, the data remapping program is executed by rewriter, and data remapping is performed such that the current data can be used by the new control program. Thus, the same data can be used by the control program before and after the control program rewrite. In accordance therewith, the control program rewrite becomes easy. In addition, since the new control program is not restricted by the existing or current data mapping, there is high expandability when creating the new control program.

According to another aspect of this invention, there is provided a vending machine having a control device. The control device comprises control program storing unit adapted to store a vending machine control program, and an arithmetic and logic unit for executing the control program. The storing unit is a rewritable memory. The control device further comprises communication controller adapted to control communication with a host computer, and rewriter adapted to rewrite the control program stored in the storing unit with the new control program received from the host computer via the communication controller.

According to this aspect, the control device can receive the new control program from the host computer a remote location and rewrite the control program from the current one to the new one.

The rewriter has a rewrite determinator adapted to determine, based on attribute information of the new control program received from the host computer together with the new control program, whether or not it should be carried out to rewrite the current one to the new one of the control program.

In another embodiment of this invention, the rewriter has a rewrite program storing unit previously storing a rewrite program of the control program, and performs rewriting of the control program by executing this rewrite program.

Alternatively, the rewrite program is sent from the host computer together with the new control program. The rewriter receives the new control program and the rewrite program and rewrites the control program from current one to the new control program by rewriting means executing the rewrite program.

Further, in the control device, the rewriter further comprises remapping program storing unit for previously storing a data remapping program. The remapping program is to perform remapping current data used by the current control program so that tho current data can be used by the new control program. When executing the data remapping program, the rewriter uses data remapping information received from the host computer together with this new control program.

In the control device, the rewriter executes the data remapping program received from the host computer together with the new control program to perform remapping of data used by the current control program so that the current data can be used by the new control program.

DESCRIPTION OF THE PREFERRED EMBODIMENTS

A vending machine control program rewrite system according to an embodiment of the present invention will be explained by referring to FIG. 1.

Figure 1:
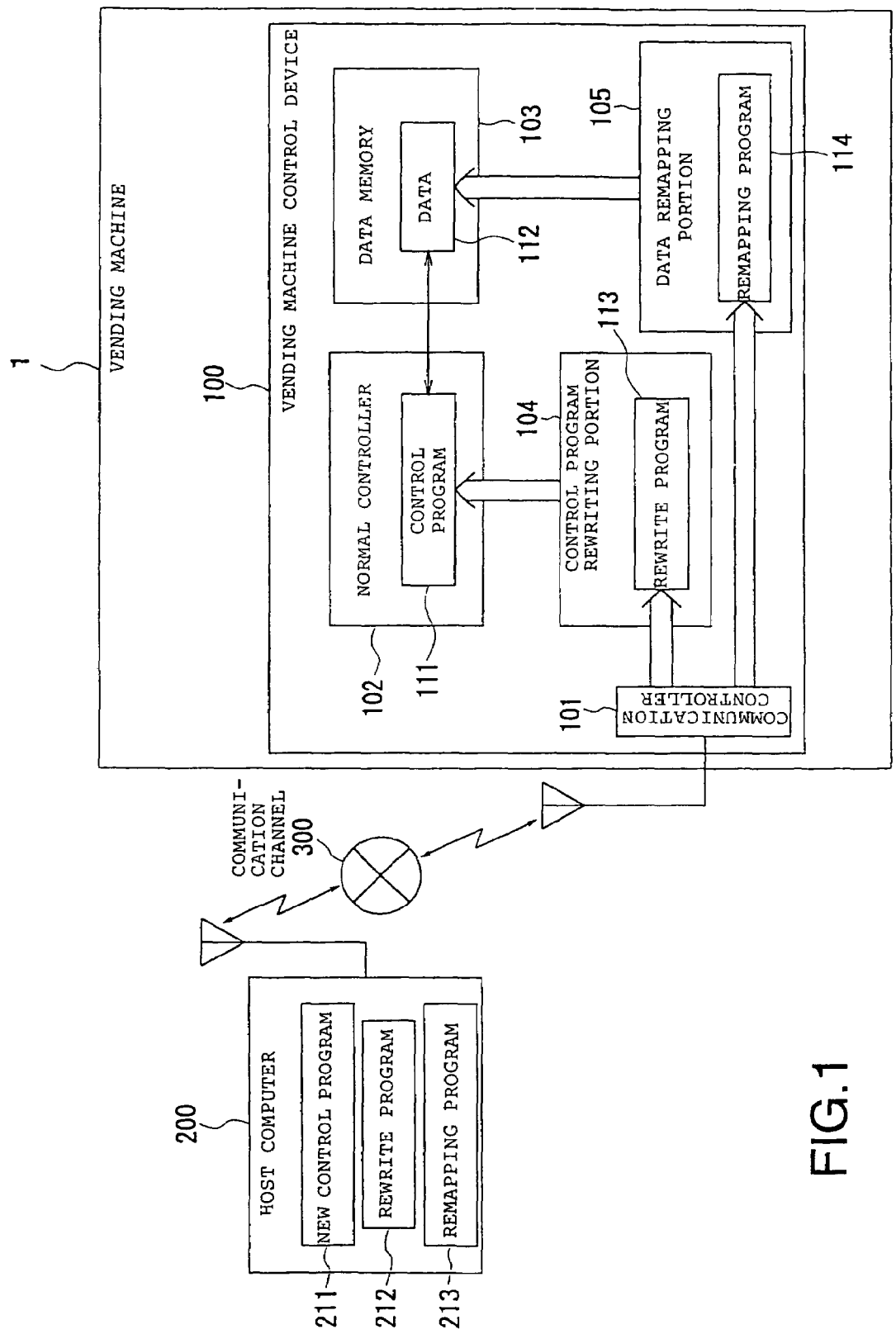
FIG. 1 is a functional block diagram of a system for rewriting a control program in a vending machine according to an embodiment of the present invention.

Referring to FIG. 1, a vending machine 1 shown therein comprises a control device 100. The control device 100 comprises a communication controller 101 for controlling communication with a host computer 200 by way of a communication channel 300; a normal controller 102 for performing control according to a control program 111 stored therein such that each controlled apparatus carries out a prescribed operation at normal times, such as at product vending and vending machine management; and a data storage portion or data memory 103 for storing data 112 used by normal controller 102 when controlling each controlled apparatus. Further, the control device 100 comprises a control program rewriting portion or rewriter 104 for rewriting a current one of the control program of normal controller 102 to a new one of the control program; and a data remapping portion 105 for remapping data stored in data storage portion 103 when the control program 111 is rewritten to the new one by control program rewriting portion 104 such that the same data can be used by the new control program.

Communication controller 101 has, as its main component, a communication apparatus that is compatible with communication channel 300. That is, communication controller 101 controls communication with host computer 200 by way of communication channel 300.

Normal controller 102 performs control such that each controlled apparatus carries out a prescribed operation at normal times, such as when a product is being vended, or when vending is managed by a manager. Normal controller 102 operates according to the control program 111. The control program 111 is stored in electrically rewritable storage.

Data storage portion 103 has as its main component a storage unit for storing data 112 that control program 111 uses. Data 112 is configured in this storage unit such that the same data can be used by control program 111.

Control program rewriting portion 104 has a function for rewrites the current one of the control program 111 of normal controller 102 to the new control program 211 sent from host computer 200 according to a rewrite program 113. Here, rewrite program 113 has been sent from host computer 200.

According to the remapping program 114, data remapping portion 105 remaps the data 112 stored in data storage portion 103 when the control program 111 is being rewritten with new control program 211 by control program rewriting portion 104 such that new control program 211 can make use of the same data. Here, remapping program 114 has been sent from host computer 200.

Host computer 200 stores new control program 211, rewrite program 212, and remapping program 213, and sends each program 211, 212, 213 to the vending machine 1. Here, host computer 200 sends each program 211, 212, 213 in accordance with a predetermined schedule.

Communication channel 300 is a communication medium for carrying out communication between vending machine control device 100 and host computer 200. Either a wireless medium or a cable can be used for communication channel 300. In this aspect of the embodiment, a wireless medium is shown.

Figure 2:
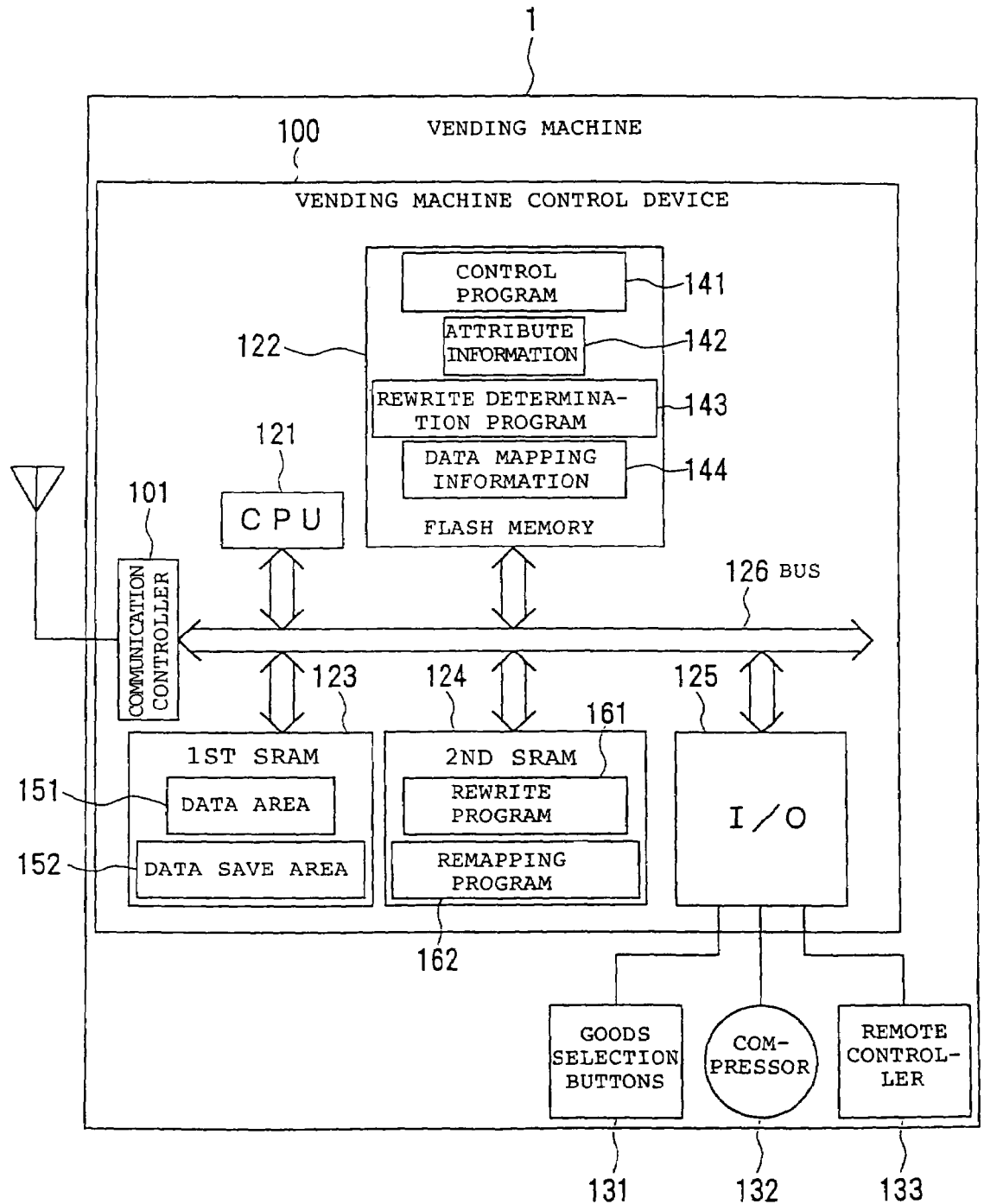
FIG. 2 is a circuit diagram of a vending machine shown in FIG. 1.
Figure 3:
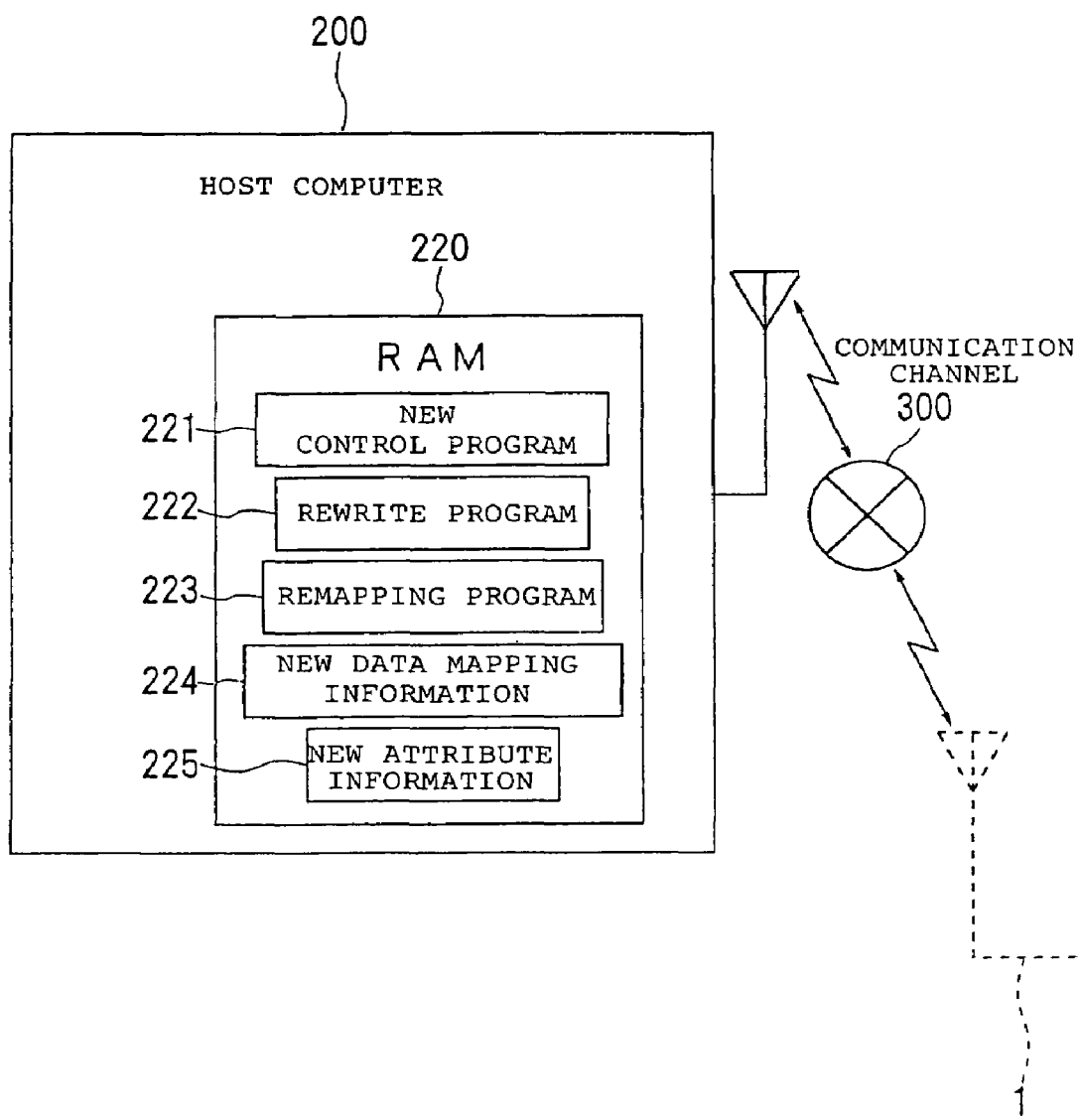
FIG. 3 is a circuit diagram of a host computer shown in FIG. 1.

An example of a specific circuit constitution of the control program rewriting system shown in FIG. 1 will be explained by referring to FIG. 2 and FIG. 3. FIG. 2 and FIG. 3 are simplified circuit diagrams of the vending machine 1 and the host computer 200.

As shown in FIG. 2, the control device 100 of the vending machine 1 has a communication controller 101 for controlling communication with host computer 200; central processing unit (CPU) 121 which is an arithmetic and logic unit; flash memory 122 which is an electrically rewritable nonvolatile memory; a first static random access memory (SRAM) 123 and a second SRAM 124 which are volatile memory; input-output (I/O) interface 125 which is an interface for connecting the various apparatus constituting the vending machine; and bus 126 for the interconnecting thereof. In this embodiment, as the various apparatus connected by I/O interface 125, there are shown a set of goods selection buttons 131 for inputting request of goods desired by a customer; compressor 132 for a refrigerator in the vending machine; and remote controller 133 operated by a vending machine manager to input and output various data.

CPU 121 is an arithmetic and logic unit for executing a program. In normal operation, the CPU 121 executes the control program 141 stored in flash memory 122. Further, when the control program is rewritten, the CPU 121 executes a variety of programs, which will be described hereinbelow.

In flash memory 122, there are stored control program 141, attribute information 142 of control program 141, rewrite determination program 143, and data mapping information 144. Control program 141 controls the vending machine 1 by inputting and outputting signals to the various apparatus connected by way of I/O interface 125. The control program 141 comprises mainly a vending program, which is executed at normal vending operations, and a management program executed by operating a remote controller. Because control by the control program 141 is the same as that with a conventional control device, explanation thereof will be omitted here. Attribute information 142 has an identifier for indicating the type of control program 141, and information related to the version thereof. Here, the identifier of control program 141 is provided for identifying a vending machine that is capable of using control program 141. Rewrite determination program 143 compares the attribute information 142 of the current control program 141 against attribute information of new control program 221 received from host computer 200, and determines whether the new control program should be rewritten in place of the current control program 141. Data mapping information 144 is information of mapping of data stored in first SRAM 123 and used by the current control program 141. Control program 141 accesses first SRAM 123 based on the data mapping information 144.

First SRAM 123 has data area 151 for storing various vending machine information, and data save area 152 for enabling data stored in this data area 151 to be temporarily saved. As this kind of data, there can be cited vending data such as number of vending machine products vended, and installation data such as the temperature inside the vending machine housing that is preset according to products sold by the vending machine. Control program 141 is constituted so as to use these various data to control the various apparatus of the vending machine.

In second SRAM 124, there are stored rewrite program 161 and remapping program 162. These programs 161 and 162 are sent from host computer 200, and programs 161 and 162 are updated each time when they are sent from host computer 200.

As shown in FIG. 3, host computer 200 has RAM 220, and in this RAM 220, there are stored new control program 221, rewrite program 222, remapping program 223, new data mapping information 224, and new attribute information 225. Host computer 200 sends these various programs 221, 222 and 223 and various information 224 and 225 to the vending machine 1 in accordance with a transmission command.

Communication channel 300 is a communication medium for carrying out communication between control device 100 and host computer 200. In this embodiment, the Personal Handyphone System (PHS) is used for the communication channel 300.

When the control program is rewritten in the control device 100, rewrite determination program 143 is executed at first, and new attribute information 225 is received. Then, a determination is made as to whether rewrite to the new control program should be carried out, comparing the new attribute information 225 and the current attribute information 142. When rewrite is determined, remapping program 223 and new data mapping information 224 are received, and remapping program 223 is then written to SRAM 124. Next, remapping program 223 is executed, and data stored in SRAM 123 is reconfigured based on new data mapping information 224 and current data mapping information 144. Then rewrite program 222 is sent from host computer 200. By executing this rewrite program 222, new control program 221 is received from host computer 200, and the current control program 141 is rewritten to the new control program 221. That is, in this embodiment, rewrite determination program 143, remapping program 223, and rewrite program 222 constitute rewriting means.

Figure 4:
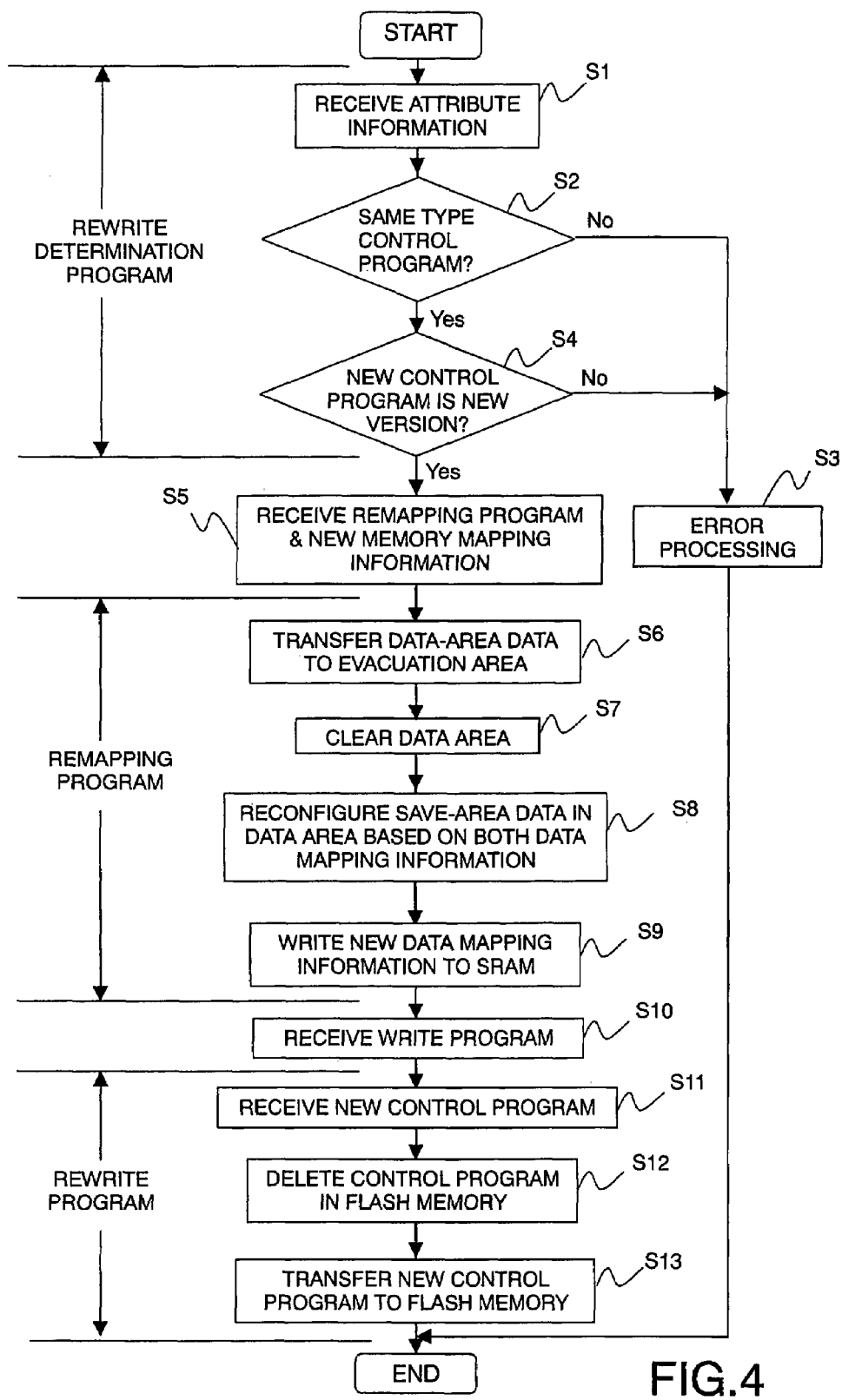
FIG. 4 is a flowchart of rewriting of a control program.

The flow of processing when a control program is rewritten will be explained in detail hereinbelow by referring to the flowchart of FIG. 4.

As described hereinabove, when the control program is rewritten, first CPU 121 executes rewrite determination program 143 stored in flash memory 122. When rewrite determination program 143 is executed, new attribute information 225 is sent to vending machine 1 from host computer 200 (Step S1). Then, an identifier which identifies the type of current control program 141 in attribute information 142 stored in flash memory 122 is compared against an identifier which identifies the type of new control program 221 in new attribute information 225 sent from host computer 200 (Step S2). If both of the types are not the same, processing is terminated (Step S3). When they are same, version information of new control program 221, which exists in new attribute information 225, is then compared against version information of current control program 141, which exists in current attribute information 142 (Step S4). If the version of new control program 221 is not newer than that of current control program 141, processing is terminated (Step S3).

When it is newer, remapping program 223 and new data mapping information 224 are then sent (Step S5), and remapping program 223 is written to SRAM 124.

Next, CPU 121 executes remapping program 223 stored in SRAM 124. When remapping program 223 is executed, first, all data stored in SRAM 123 is transferred to data save area 152 (Step S6). This is to prevent the data from being destroyed when data remapping is performed. Next, the contents of data area 151 of SRAM 123 are cleared (Step S7). Then, all data saved to data save area 152 is reconfigured in data area 151 based on current data mapping information 144 and new data mapping information 224 (Step S8). Next, new data mapping information 224 is written to SRAM 123 as current data mapping information 144 (Step S3).

Then, rewrite program 222 is sent to vending machine 1 from host computer 200 (Step S10). This rewrite program 222 is written to SRAM 124.

Next, CPU 121 executes rewrite program 222 stored in SRAM 124. When rewrite program 222 is executed, new control program 221 is received (Step S11), control program 141 storage area in flash memory 122 is initialized (Step S12), and new control program 221 is written to flash memory 122 (Step S13).

In this manner, the communication controller 101 is disposed in control device 100 for receiving new control program 221 sent from host computer 200. Therefore, new control program 221 can be sent to the vending machine 1 from a remote location. In accordance therewith, the rewriting of control program 141 becomes easy, making it possible to greatly reduce the time and trouble required for updating control program 141.

Further, because new attribute information 225 having type and version information of new control program 221, is received so that a determination of rewrite to the new control program is made based on this new attribute information 225. Then, the control program is rewritten according to the rewrite program when the rewriting of control program 141 is required, for example when the new control program 221 is of a new version. Further, when rewriting is not required, such as when the new control program belongs to a different type, the control program is not rewritten. With such configurations, the control program will never be mistakenly rewritten with a control program for another type of vending machines, nor rewritten with an old version of the control program.

Further, because the control program is rewritten by executing rewrite program 222 sent from host computer 200 together with new control program 221, the appropriate rewrite program can be received. For example, in a case in which the contents of the new control program are greatly different from those of the current control program, an appropriate rewrite program corresponding to the changed contents can be used, and the updating of the control program can be efficiently carried out.

Further, remapping program 223 is sent from host computer 200 together with new control program 221 and is executed in the control device 100 of the vending machine 1, data used by the current control program is remapped so as to be usable by new control program 221. Therefore, the data can be used before and after the rewriting of the control program. In accordance therewith, the rewriting of the control program becomes easy. In addition, because there are no limitations imposed by an existing or current data mapping, there is high expandability when rewriting the new control program. Furthermore, in a case, for example, in which the contents of the new control program are changed greatly from those of the current control program, it is possible to use an appropriate remapping program that corresponds to the changed contents. This enables the updating of a control program to be performed efficiently.

Figure 5:
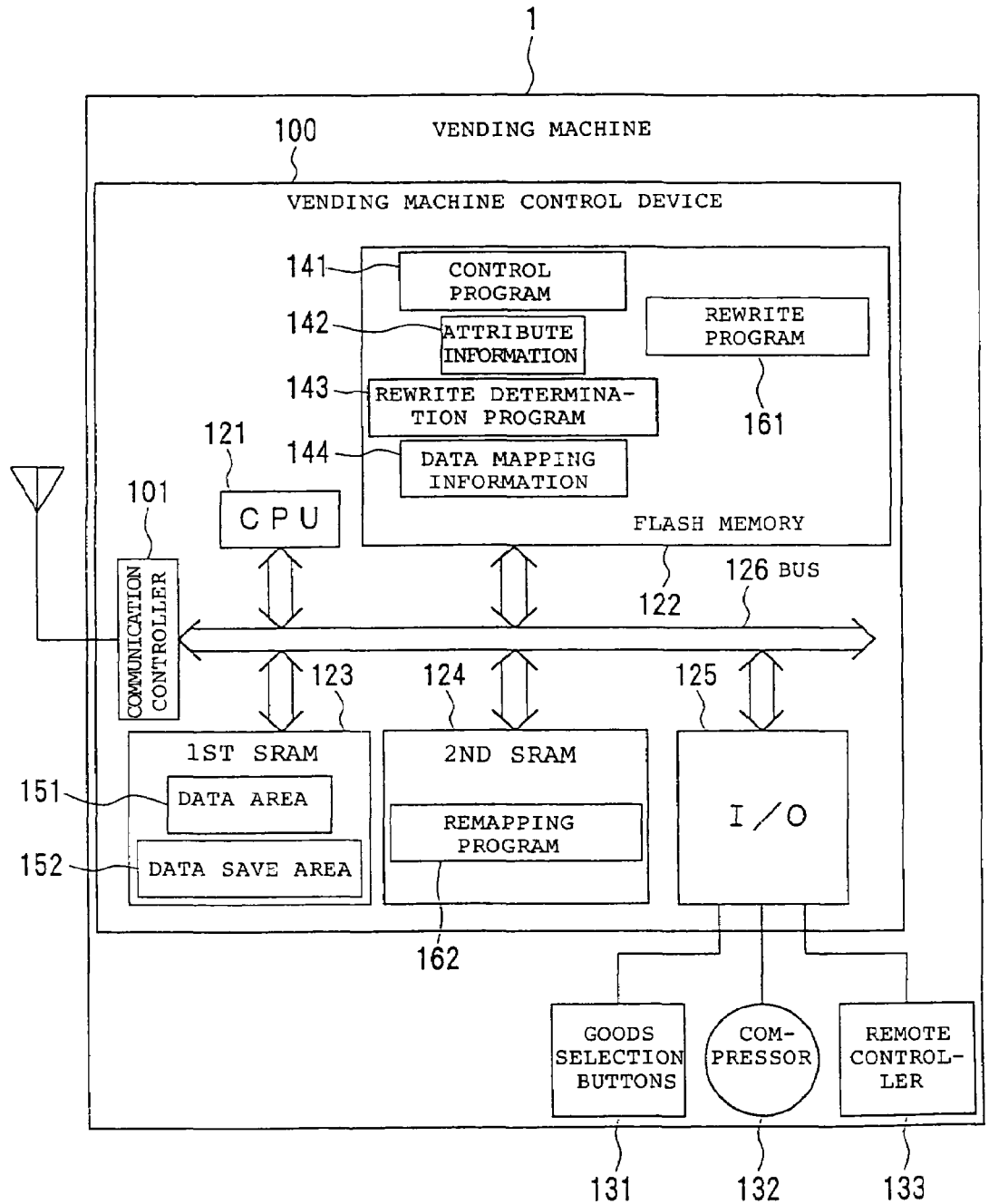
FIG. 5 is a circuit diagram of a vending machine according to another embodiment.

Furthermore, in the above-mentioned embodiment, rewrite program 222 was sent together with new control program 221. Alternatively, rewrite program 222 can be previously stored in flash memory 122 as shown at 161 in FIG. 5. In this case, it is not necessary for the rewrite program to be sent from host computer 200. In this constitution, because the rewrite program is stored in control device 100, the rewrite program can be executed with certainty.

Figure 6:
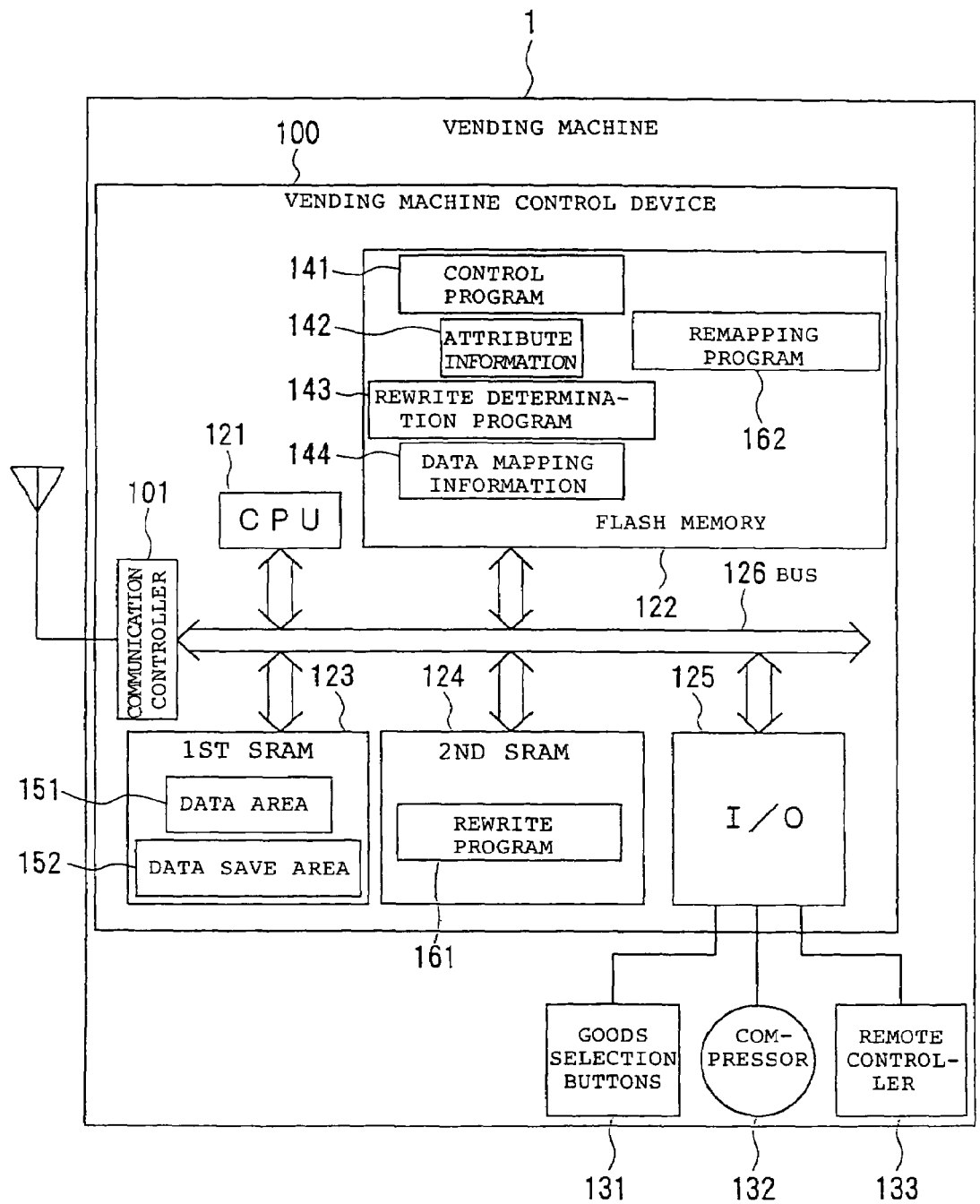
FIG. 6 is a circuit diagram of a vending machine according to another embodiment.

Further, in the embodiment of FIG. 2, remapping program 223 was sent together with new control program 221, but remapping program 223 can also be previously stored in flash memory 122 as shown at 162 in FIG. 6. In this case, it is not necessary to send remapping program 223 from host computer 200. In this constitution, because the remapping program is stored in control device 100, the remapping program can be executed with certainty.

Figure 7:
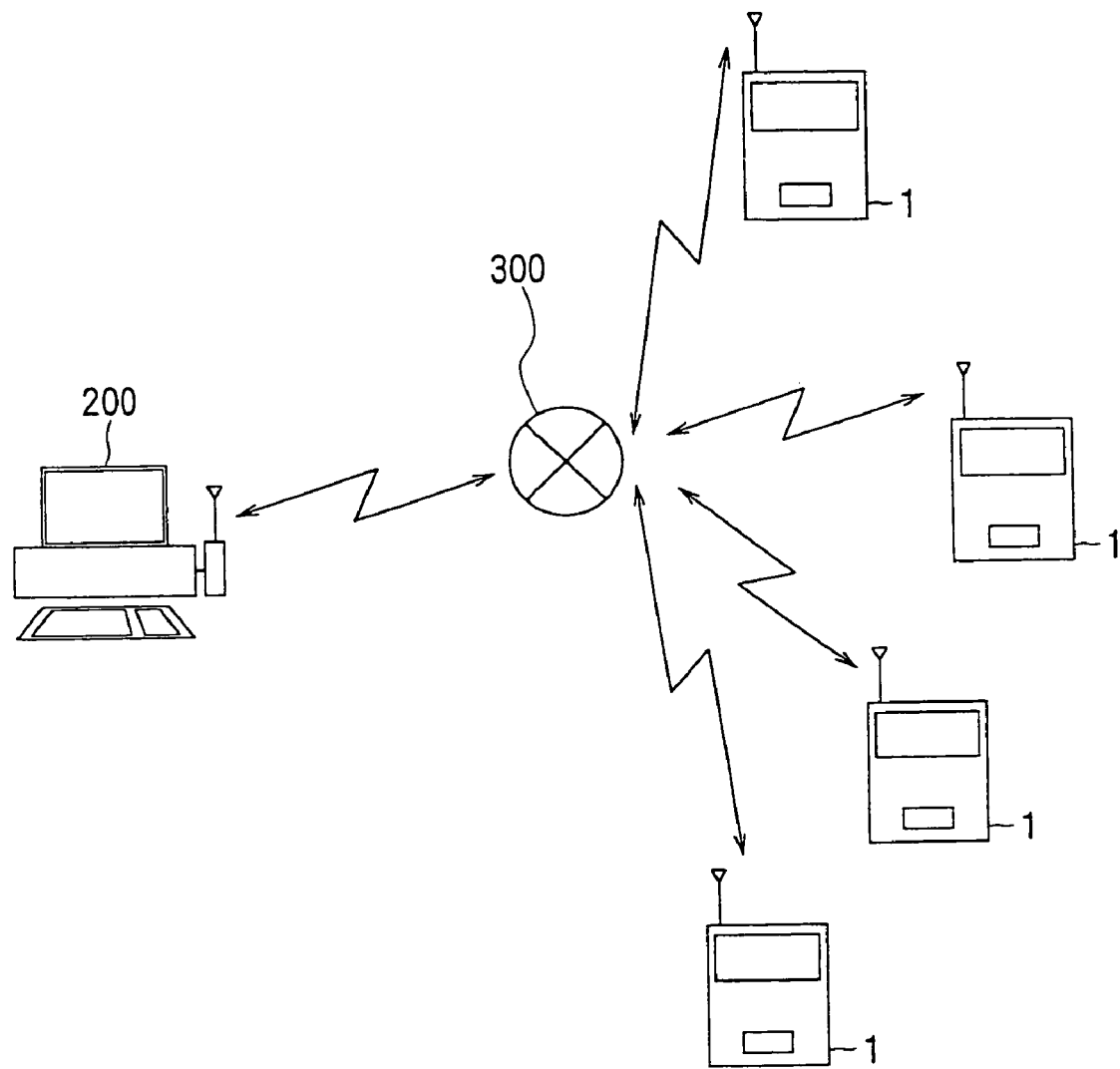
FIG. 7 is a simplified block diagram of a system for rewriting the control program in a plurality of vending machines.

FIG. 7 shows a simplified block diagram of another embodiment of a vending machine control program rewrite system comprising a control device of the above-mentioned embodiment. This vending machine control program rewrite system comprises a plurality of vending machines 1, a host computer 200, and a communication channel 300, and each vending machine 1 has the above-mentioned control device 100.

Communication controller 101 of each control device 100 has a PHS terminal, and is connected via communication channel 300, which is a PHS network.

Host computer 200 also has a PHS terminal just like control device 100, and is connected via communication channel 300, which is a PHS network. Here, a plurality of vending machines 1 is connected to one host computer 200 through PHS network 300. A schedule for sending the new control program is stored in host computer 200, and the new control program is sent in accordance with this schedule. For example, the date on which the regular price of a vending product changes, or the date of the commencement of the sale of a new product is incorporated as a schedule.

Communication channel 300 is a public PHS network, and connects each vending machine 1 to host computer 200. That is, it is a state in which host computer 200 is capable of performing multi-address transmission to all of vending machines 1.

In the control program rewrite system, the new control program is sent to each vending machine 1 simultaneously by host computer 200 in accordance with the above-mentioned schedule.

In this manner, with the vending machine control program rewrite system of this embodiment, the current ones of the control program of a plurality of vending machines 1 can be rewritten at the same time. Therefore, it is possible to reduce the time required for updating a plurality of vending machine control programs.

Further, since the new control program is sent in accordance with a predetermined schedule, a control program can be rewritten in a timely manner matching when the regular price of a vending product changes, or the sale of a new product gets underway.

Furthermore, in the above-mentioned embodiment, the new control program is sent to a plurality of vending machines simultaneously. However, the new control program can also be sent to each vending machine individually. In this case, it becomes possible to make minute control program settings for each vending machine.

Figure 8:
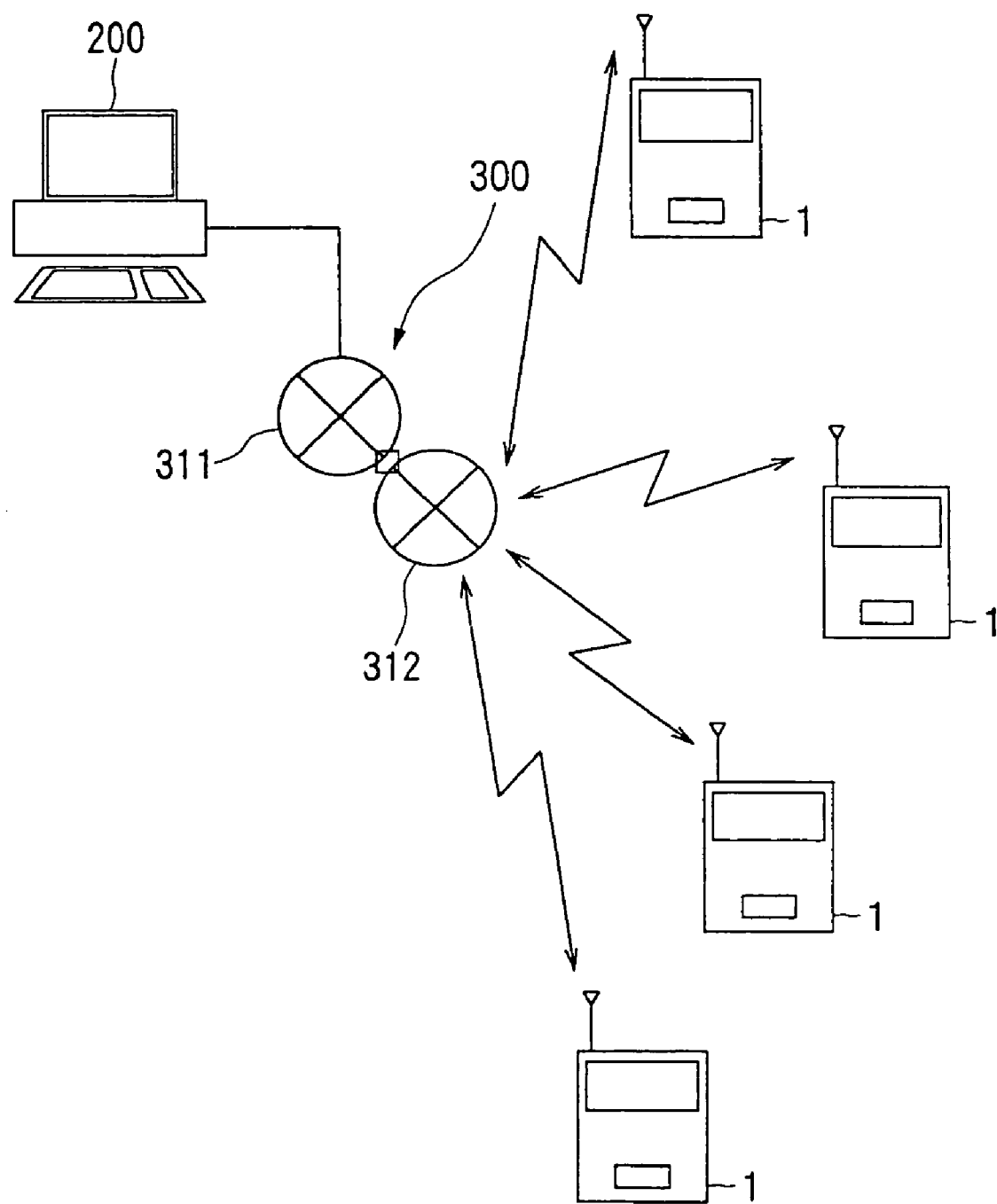
FIG. 8 is a simplified block diagram of a modification of the system shown in FIG. 7.

Further, in the above-mentioned embodiment of FIG. 7, the PHS network which is a public network is used as the communications channel 300. However, any kind of circuit can be used as long as the host computer 200 can communicate with each vending machine 1. For example, a dedicated line can be used to connect host computer 200 with each vending machine 1. Furthermore, in the above-mentioned embodiment of FIG. 7, it was indicated that the communication channel 300 on the host computer 200 side and on the side of each of the vending machines 1 was a wireless network, but the communications channel 300 can also be either a cable network or a combination of cable and wireless network, for example, as shown in FIG. 8, the host computer 200 side is connected via an Integrated Services Digital Network (ISDN) system 311 which is a cable network, and the side of each of the vending machines is connected via the PHS network, which is a wireless network.

What is claimed is:

1. A vending machine control program rewrite system for rewriting a control program of a vending machine, comprising:
   a storage unit that stores a control program;
   a receiver adapted to receive from a host computer
       a new version of the control program, and
       new data mapping information associated with the new version of the control program;
   a rewriter adapted to rewrite said storage unit to update a current version of the control program to said new version of the control program;
   a remapping portion that remaps data used by said current version of the control program based on said new data mapping information, so that data remapped by the remapping portion is capable of being used by said new version of said control program; and
   a controller for executing said new version of the control program stored in said storage unit.

2. The vending machine control program rewrite system recited in claim 1, wherein
   the receiver is adapted to receive new attribute information for said new version of the control program; and
   said rewriter includes a rewrite determinator adapted to determine, based on said new attribute information received from the host computer, whether or not to rewrite said storage unit to update a current version of the control program to said new version of the control program.

3. The vending machine control program rewrite system recited in claim 1, further comprising
   a rewriting portion that stores a rewrite program therein, and
   wherein said rewriter rewrites said storage unit to update a current version of the control
   program to said new version of the control program by executing said rewrite program.

4. The vending machine control program rewrite system recited in claim 1, wherein
   said receiver is adapted to receive from the host computer
       a rewrite program with said new version of the control program, and
   said rewriter rewrites said storage unit to update a current version of the control program to said new version of the control program by executing said rewrite program received from the host computer.

5. The vending machine control program rewrite system recited in claim 1, wherein
   said receiver is adapted to receive from the host computer
       a data remapping program for carrying out remapping of said data with said new version of the control program, and
   said rewriter performs data remapping by executing said received data remapping program.

6. The vending machine control program rewrite system recited in claim 1, wherein said storage unit is a rewritable memory.

7. A vending machine control device, comprising
   a storage unit that stores a control program;
   an arithmetic and logic unit for executing said control program stored in the storage unit,
       a communication controller adapted to control communication with a host computer in which the control device receives from the host computer
   a new version of the control program, and
   data mapping information associated with the new version of the control program;
       a rewriter adapted to rewrite the control program from a current version stored in said storage unit to said new version of the control program received from the host computer via said communication controller, and execute a data remapping program with reference to said data mapping information received from the host computer to remap data used by said current version of said control program so that said data is capable of being used by said new version of the control program.

8. The vending machine control device recited in claim 7, wherein
   said communication controller is adapted to control communication with a host computer in which the control device receives from the host computer attribute information of said new version of the control program; and
   said rewriter has a rewrite determinator adapted to determine based on said attribute information received from the host computer whether or not said current version of the control program should be rewritten to said new version of the control program.

9. The vending machine control device recited in claim 7, wherein said rewriter
   includes a rewrite program store previously storing a rewrite program for rewriting the control program, and
   performs rewrite of the control program by executing said rewrite program.

10. The vending machine control device recited in claim 7, wherein said rewriter performs rewrite of the control program by executing a rewrite program received from the host computer.

11. The vending machine control device recited in claim 7, wherein said rewriter, when performing rewriting of the control program to new one of the control program, executes said data remapping program with reference to data mapping information received from the host computer to remap data used by said current version of the control program so that said data can be used by said new version of the control program.

12. A vending machine control program rewrite system for rewriting a control program of a vending machine, comprising:

a storage unit storing a control program;
a receiver adapted to receive
  a new version of the control program from a host computer, and
  new data mapping information used by said new version of the control program, and
a remapping program;
a rewriter adapted to rewrite said control program in said rewritable memory from a current version of said control program to a new version of the control program;
a data remapping portion that executes the remapping program in order to remap data used by said current version of the control program, based on current and said new data mapping information, so that said data is capable of being used by said new version of the control program; and
a control device including a controller for executing said new control program.

13. The vending machine control program rewrite system according to claim 12, wherein said receiver receives said new version of the control program to in accordance with a predetermined schedule.

14. The vending machine control program rewrite system according to claim 12, wherein:
  said receiver receives a new attribute information for said new version of the control program; and
  said rewriter includes a rewrite determinator adapted to determine, based on said new attribute information, whether or not a current version of said control program should be rewritten to said new version of the control program.

15. The vending machine control program rewrite system according to claim 12, said control device having a rewrite program previously stored therein, wherein said rewriter performs rewrite of the control program to said new one by executing said rewrite program.

16. The vending machine control program rewrite system according to claim 12, wherein:
  said receiver receives a rewrite program for rewriting to said new one of the control program; and
  said rewriter performs rewrite of a current version of said control program to said new version of said control program by executing said rewrite program received from the host computer.

17. The vending machine control program rewrite system according to claim 12, wherein said rewriter performs data remapping by executing said data remapping program received from the host computer.

* * * * *